(12) United States Patent
Porter et al.

(10) Patent No.: US 10,589,454 B2
(45) Date of Patent: Mar. 17, 2020

(54) BOTTLE WITH EXTENDED NECK FINISH AND METHOD OF MAKING SAME

(71) Applicant: Silgan Plastics LLC, Chesterfield, MO (US)

(72) Inventors: Randal Porter, Norcross, GA (US); Neal Thomas, Lawrenceville, GA (US)

(73) Assignee: Silgan Plastics LLC, Chesterfield, MO (US)

( * ) Notice: Subject to any disclaimer, the term of this patent is extended or adjusted under 35 U.S.C. 154(b) by 33 days.

(21) Appl. No.: 16/022,084

(22) Filed: Jun. 28, 2018

(65) Prior Publication Data

US 2018/0304518 A1    Oct. 25, 2018

Related U.S. Application Data

(60) Division of application No. 14/977,246, filed on Dec. 21, 2015, now Pat. No. 10,035,292, which is a
(Continued)

(51) Int. Cl.
*B29C 49/48* (2006.01)
*B29C 49/06* (2006.01)
(Continued)

(52) U.S. Cl.
CPC ............. *B29C 49/48* (2013.01); *B29B 11/08* (2013.01); *B29B 13/02* (2013.01); *B29C 49/0073* (2013.01); *B29C 49/0078* (2013.01); *B29C 49/06* (2013.01); *B29C 49/30* (2013.01); *B29C 49/4205* (2013.01); *B29C 49/6409* (2013.01); *B29D 22/003* (2013.01); *B65D 1/023* (2013.01); *B65D 1/0246* (2013.01); *B29B 2911/1402* (2013.01); *B29B 2911/1404* (2013.01); *B29B 2911/14026* (2013.01); *B29B 2911/14033* (2013.01); *B29B 2911/1442* (2013.01); *B29B 2911/14333* (2013.01);
(Continued)

(58) Field of Classification Search
CPC ............ B29C 49/0078; B29C 49/4205; B29C 2049/4884; B29C 2049/4887; B29C 2049/4889; B29C 2049/563
See application file for complete search history.

(56) References Cited

U.S. PATENT DOCUMENTS

3,347,420 A   10/1967   Donoghue
3,581,953 A   6/1971    Donoghue
(Continued)

*Primary Examiner* — Atul P. Khare
(74) *Attorney, Agent, or Firm* — Reinhart Boerner Van Deuren s.c.

(57) ABSTRACT

A blow molded synthetic resin bottle has a body and an elongated neck with the body providing a shoulder extending about the base of the neck. The neck has a first collar extending thereabout spaced adjacent the shoulder and at least one additional collar extending thereabout adjacent the upper end of the neck. The resin in the neck is substantially unoriented. To produce the bottle, a synthetic resin preform is injection molded with a generally tubular body and the elongated neck. This preform is placed in a blow mold cavity having a body receiving portion and a neck receiving portion that has a recess extending thereabout seating the first collar therein. The additional collar is disposed outwardly of the mold cavity and is disposed on the upper surface of the mold.

12 Claims, 9 Drawing Sheets

Related U.S. Application Data continuation of application No. 14/098,200, filed on Dec. 5, 2013, now Pat. No. 9,248,603, which is a continuation of application No. 12/328,696, filed on Dec. 4, 2008, now Pat. No. 8,632,722, which is a division of application No. 11/075,932, filed on Mar. 8, 2005, now abandoned.

(51) Int. Cl.
| | | |
|---|---|---|
| *B29C 49/42* | (2006.01) | |
| *B29C 49/00* | (2006.01) | |
| *B65D 1/02* | (2006.01) | |
| *B29C 49/30* | (2006.01) | |
| *B29C 49/64* | (2006.01) | |
| *B29D 22/00* | (2006.01) | |
| *B29B 11/08* | (2006.01) | |
| *B29B 13/02* | (2006.01) | |
| *B29C 49/56* | (2006.01) | |
| *B29K 67/00* | (2006.01) | |
| *B29L 31/00* | (2006.01) | |

(52) U.S. Cl.
CPC .............. *B29B 2911/14337* (2015.05); *B29B 2911/14433* (2013.01); *B29B 2911/14473* (2013.01); *B29C 2049/4884* (2013.01); *B29C 2049/4887* (2013.01); *B29C 2049/4889* (2013.01); *B29C 2049/563* (2013.01); *B29K 2067/003* (2013.01); *B29L 2031/7158* (2013.01); *B65D 2501/0018* (2013.01); *B65D 2501/0036* (2013.01); *Y10T 428/1352* (2015.01)

(56) References Cited

U.S. PATENT DOCUMENTS

| | | | |
|---|---|---|---|
| 3,628,700 A | 12/1971 | Donoghue | |
| 4,070,140 A | 1/1978 | Lucas et al. | |
| 4,201,316 A | 5/1980 | Klingaman | |
| 4,451,426 A | 5/1984 | Branchadell | |
| 4,487,568 A | 12/1984 | Wiatt et al. | |
| 4,512,948 A | 4/1985 | Jabarin | |
| 4,552,527 A | 11/1985 | Hunter | |
| 4,603,831 A * | 8/1986 | Krishnakunnar | B29C 45/26 215/370 |
| 4,629,598 A | 12/1986 | Thompson | |
| D288,662 S | 3/1987 | Obuchowski | |
| 4,646,925 A | 3/1987 | Nohara | |
| 4,671,763 A | 6/1987 | Weiler | |
| 4,715,504 A | 12/1987 | Chang et al. | |
| 4,818,575 A * | 4/1989 | Hirata | B29C 49/22 428/36.7 |
| D304,681 S | 11/1989 | Metaxa | |
| 4,954,376 A | 9/1990 | Krishnakumar et al. | |
| D310,963 S | 10/1990 | Segati | |
| 4,971,226 A | 11/1990 | Donoghue | |
| D313,935 S | 1/1991 | Miller | |
| D316,815 S | 5/1991 | Kalin et al. | |
| 5,049,349 A * | 9/1991 | McCullough | B29C 49/24 264/515 |
| D321,651 S | 11/1991 | Cochran | |
| D321,829 S | 11/1991 | Iazzetta | |
| D323,617 S | 2/1992 | Miller | |
| 5,122,325 A | 6/1992 | Bartley et al. | |
| 5,169,654 A | 12/1992 | Koga | |
| D336,046 S | 6/1993 | Donoghue | |
| 5,255,889 A | 10/1993 | Collette et al. | |
| 5,330,081 A | 7/1994 | Davenport | |
| 5,364,585 A | 11/1994 | Takeuchi | |
| D353,324 S | 12/1994 | Rice, III | |
| D356,502 S | 3/1995 | Poandl | |
| D357,416 S | 4/1995 | Valentine | |
| D360,363 S | 7/1995 | Minale | |
| D360,831 S | 8/1995 | Boisset | |
| 5,447,766 A | 9/1995 | Orimoto et al. | |
| 5,588,544 A | 12/1996 | Takashima et al. | |
| D379,765 S | 6/1997 | Hencher | |
| 5,645,183 A | 7/1997 | Slat | |
| D387,993 S | 12/1997 | Workman et al. | |
| D388,712 S | 1/1998 | Lyngdal et al. | |
| 5,780,130 A | 7/1998 | Hansen et al. | |
| D400,434 S | 11/1998 | Amos et al. | |
| 5,888,598 A | 3/1999 | Brewster et al. | |
| 5,918,752 A | 7/1999 | Meyer | |
| 6,082,565 A | 7/2000 | Harrold | |
| 6,113,377 A | 9/2000 | Clark | |
| 6,209,762 B1 | 4/2001 | Haffner et al. | |
| D450,597 S | 11/2001 | Bobchenok et al. | |
| 6,312,641 B1 | 11/2001 | Hutchinson | |
| D452,159 S | 12/2001 | Belser et al. | |
| 6,382,954 B1 | 5/2002 | Mai | |
| 6,447,281 B1 | 9/2002 | Petre | |
| 6,451,243 B1 * | 9/2002 | Takada | B29C 49/18 264/530 |
| 6,568,156 B2 | 5/2003 | Silvers et al. | |
| 6,572,812 B2 | 6/2003 | Collette et al. | |
| D484,419 S | 12/2003 | Potocki et al. | |
| 6,673,303 B2 | 1/2004 | White et al. | |
| 6,681,548 B2 | 1/2004 | Silvers et al. | |
| D486,072 S | 2/2004 | Potocki et al. | |
| 6,709,624 B2 * | 3/2004 | Lisch | B29C 49/4205 264/537 |
| 6,740,283 B2 * | 5/2004 | Matsui | B29C 45/0025 264/132 |
| D498,144 S | 11/2004 | Illenberger et al. | |
| 6,824,731 B1 * | 11/2004 | Zoppas | B29C 49/4205 264/523 |
| 6,875,396 B1 | 4/2005 | Limanjaya | |
| D505,079 S | 5/2005 | Mulder et al. | |
| 6,890,621 B2 | 5/2005 | Nakamura et al. | |
| 6,896,943 B1 * | 5/2005 | Beale | B29C 49/0073 428/36.9 |
| D511,460 S | 11/2005 | Deubel et al. | |
| D512,316 S | 12/2005 | Illenberger et al. | |
| 7,121,821 B2 | 10/2006 | Pickel | |
| 7,303,795 B2 | 12/2007 | Neal et al. | |
| 7,364,045 B2 | 5/2008 | Dygert et al. | |
| 7,491,358 B2 | 2/2009 | Gernhuber | |
| 7,531,125 B2 | 5/2009 | Dygert et al. | |
| 2002/0037338 A1 | 3/2002 | Lisch et al. | |
| 2003/0077349 A1 | 4/2003 | Derouault et al. | |
| 2004/0070119 A1 | 4/2004 | Fibbia et al. | |
| 2004/0108627 A1 | 6/2004 | Shumann | |
| 2004/0113326 A1 | 6/2004 | Gernhuber et al. | |
| 2005/0163952 A1 | 7/2005 | Beale | |
| 2007/0212442 A1 * | 9/2007 | Nonogaki | B29C 49/48 425/541 |
| 2007/0290413 A1 | 12/2007 | Tonga | |
| 2009/0085261 A1 | 4/2009 | Porter et al. | |
| 2009/0159482 A1 | 6/2009 | Begley et al. | |

\* cited by examiner

FIG. 8

BOTTLE WITH EXTENDED NECK FINISH AND METHOD OF MAKING SAME

CROSS-REFERENCE TO RELATED PATENT APPLICATIONS

This application is a divisional of prior U.S. application Ser. No. 14/977,246, filed Dec. 21, 2015, which is a continuation of prior U.S. application Ser. No. 14/098,200, filed Dec. 5, 2013, now U.S. Pat. No. 9,248,603, which is a continuation of prior U.S. application Ser. No. 12/328,696, filed Dec. 4, 2008, now U.S. Pat. No. 8,632,722, which is a divisional of prior U.S. application Ser. No. 11/075,932, filed Mar. 8, 2005, which are incorporated herein by reference in their entireties.

BACKGROUND OF THE INVENTION

The present invention relates to blow molded bottles having an elongated neck finish and to a method for making same.

Blow molded synthetic resin bottles generally have a body and a neck finish to receive a closure. They are produced in molds by blowing a heated injection molded preform outwardly against the walls of a mold cavity.

When the resin of the preform is orientable, the blow molding of the preform outwardly, both radially and longitudinally, against the walls defining the mold cavity produces orientation of the molecules of the resin. However, it is desirable to have the mold cavity snugly seat the neck finish so that it retains its molded dimensions and unoriented structure.

For some applications, bottles with neck finishes of substantial length are desired and this can produce problems when using standard automated equipment. The clearance above the mold may be limited so as to preclude the conventional preform neck finish having a positioning and gripping collar adjacent its lower end which seats on the outer surface of the mold. The preform is generally deposited in the mold cavity by a gripper which engages the collar on the neck finish and that collar seats on the upper surface of the mold to position the preform properly within the mold cavity.

It is an object of the present invention to provide a novel synthetic resin bottle having an extended neck finish.

It is also an object to provide such a bottle which can be readily fabricated in existing blow molding equipment.

Another object is to provide a novel method for making synthetic resin blow molded bottles with extended neck finishes.

SUMMARY OF THE INVENTION

It has now been found that the foregoing and related objects may be attained in a blow molded synthetic resin bottle having a body and a neck finish. The body provides a shoulder extending about the base of the neck finish. Generally, the neck finish is elongated and may have a first collar extending thereabout adjacent the shoulder. The neck finish also has at least one additional collar extending thereabout adjacent its upper end. The resin in the first collar and in the remainder of the neck finish thereabove is substantially unoriented.

Generally, the neck portion has a thread formation thereabout above the at least one additional collar, and the first collar may be provided with lugs configured and dimensioned to cooperate with a child-resistant cap which engages therewith. Desirably, the first collar has an upper portion of substantially the same diameter as the other collar and a lower portion of larger diameter. The upper portion may have circumferentially spaced lugs to provide engagement with a child-resistant cap. Preferably, the other collar comprises a pair of axially spaced rings adapted to seat a carrier arm or gripper therebetween.

In the method for making the synthetic resin blow molded bottles, a synthetic resin preform is injection molded with a generally tubular body portion and a neck finish. The neck finish will generally have the first collar adjacent the body portion and a second collar adjacent the upper end portion of the neck finish. The preform is heated and placed in a blow mold cavity having a body receiving portion and a neck finish receiving portion which includes a recess extending thereabout and seating the first collar therein. The additional collar is disposed outwardly of the mold cavity and seats on the upper surface of the mold.

The body portion of the preform is blown into conformity with the walls of the body portion of the cavity to provide a blow molded synthetic resin bottle having a body and a neck finish.

DETAILED DESCRIPTION OF THE PREFERRED EMBODIMENTS

Figure 1:
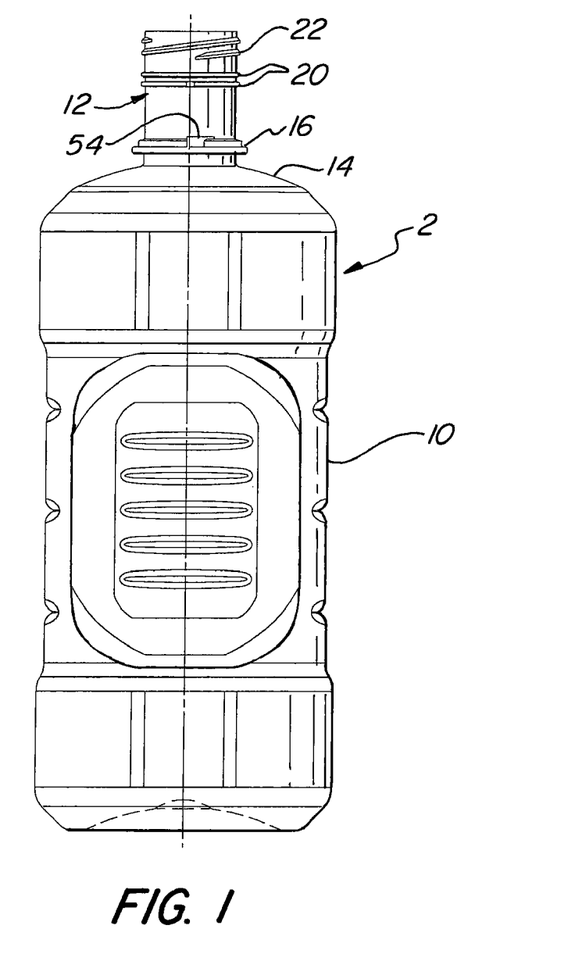
FIG. 1 is a perspective view of a bottle with an extended neck finish embodying the present invention.

Turning first to FIG. 1, a bottle generally designated by the numeral 2 and embodying the present invention has an elongated cylindrical body 10 and an extended neck finish generally designated by the numeral 12. Adjacent the shoulder portion 14 at the upper end of the body 10 is a first collar 16 on the neck finish 12. A second collar generally designated by the numeral 18 and comprising a pair of axially spaced transfer rings 20 is provided adjacent the upper end of the neck finish 12. Spaced above the second collar 18 are thread formations 22 which will engage with cooperating formations on the closure (not shown).

Figure 2:
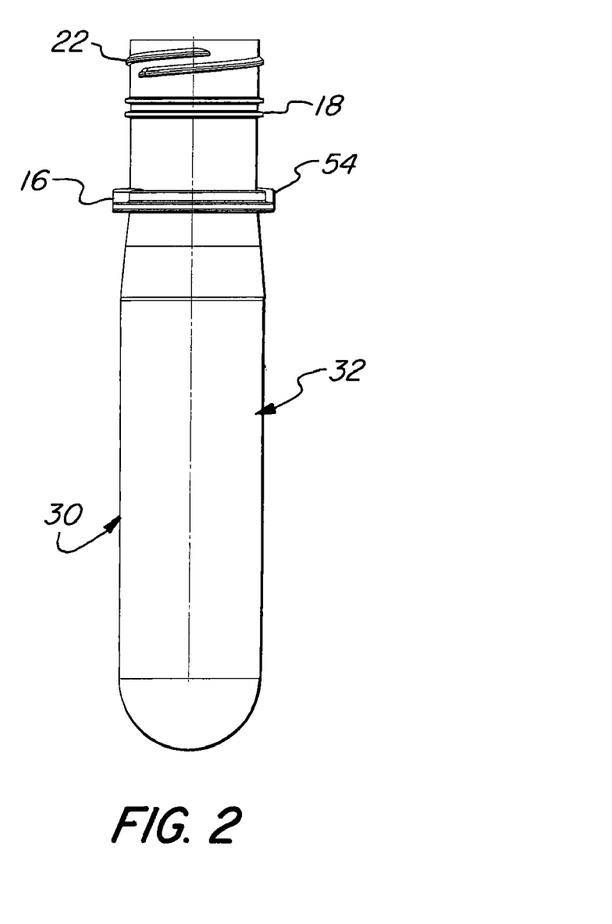
FIG. 2 is a side elevational view of the preform to produce the bottle of FIG. 1.

Turning next to FIG. 2, a hollow preform generally designated by the numeral 30 is molded with the desired neck finish shown in FIG. 1 and an elongated, generally tubular body portion 32.

Figure 3:
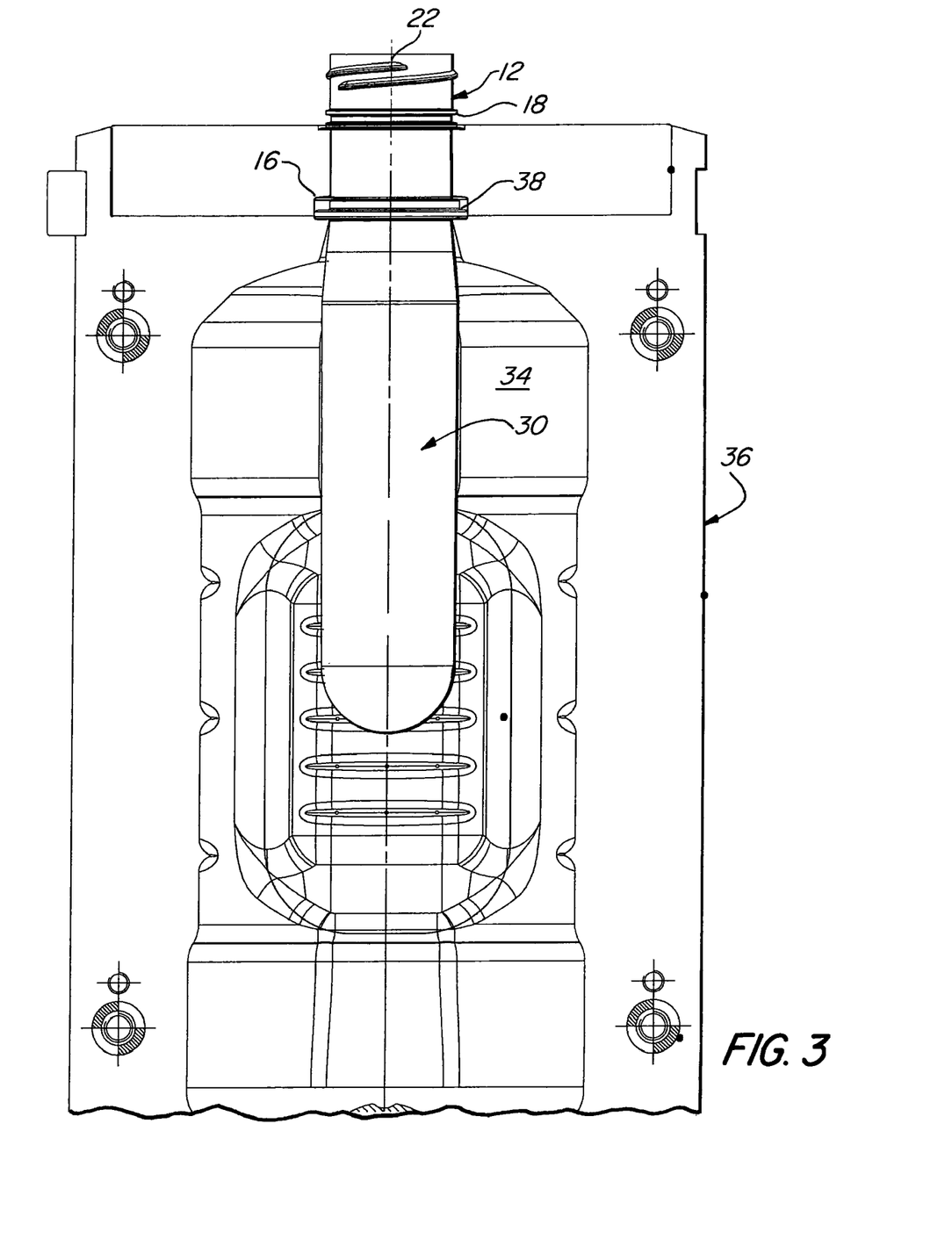
FIG. 3 is a fragmentary view of the preform for the bottle of FIG. 1 seated in a blow mold shown in section.
Figure 4A:
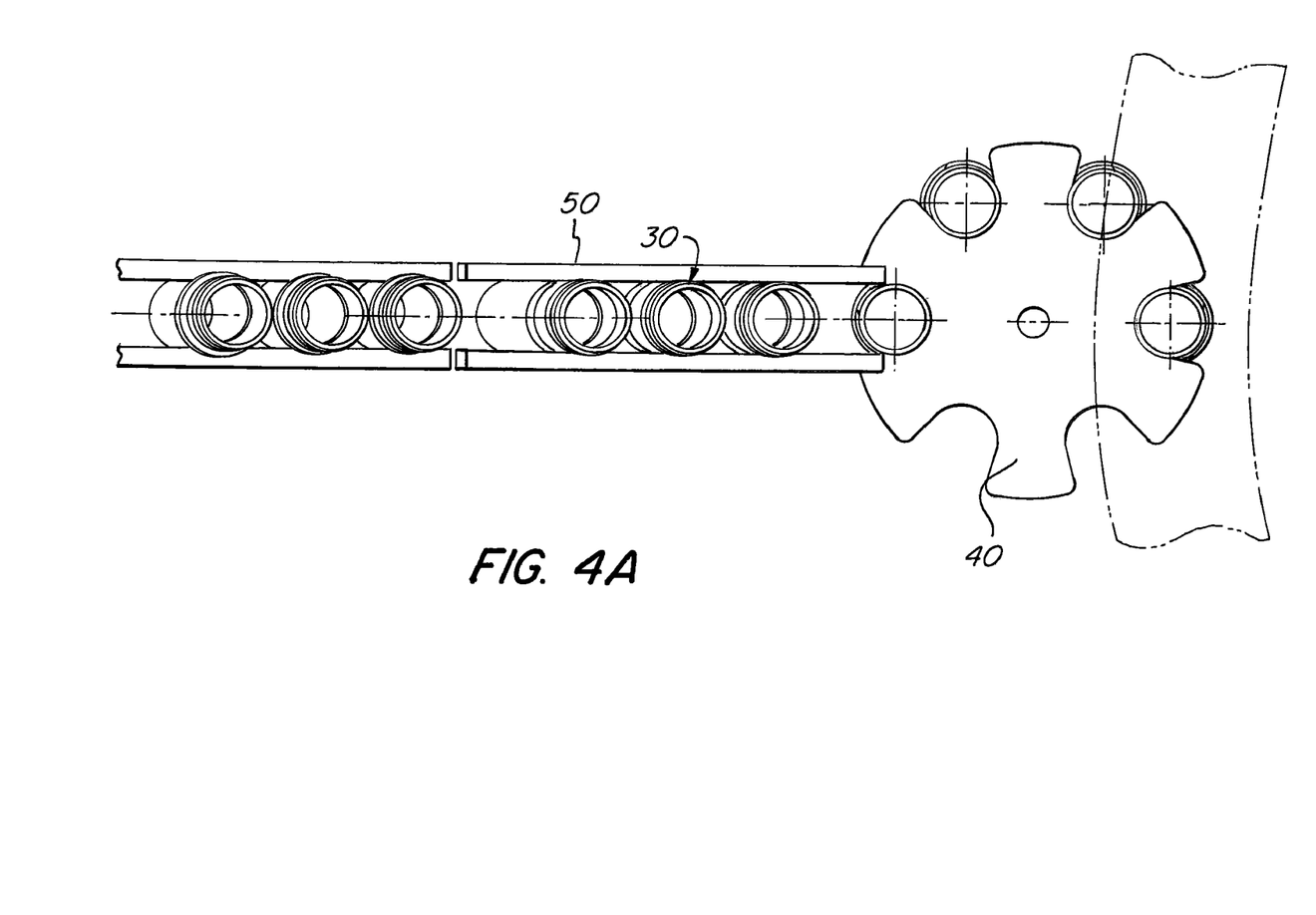
FIG. 4A is a diagrammatic top view of preforms being fed on a pair of rails into, and seated in, an infeed wheel.
Figure 4B:
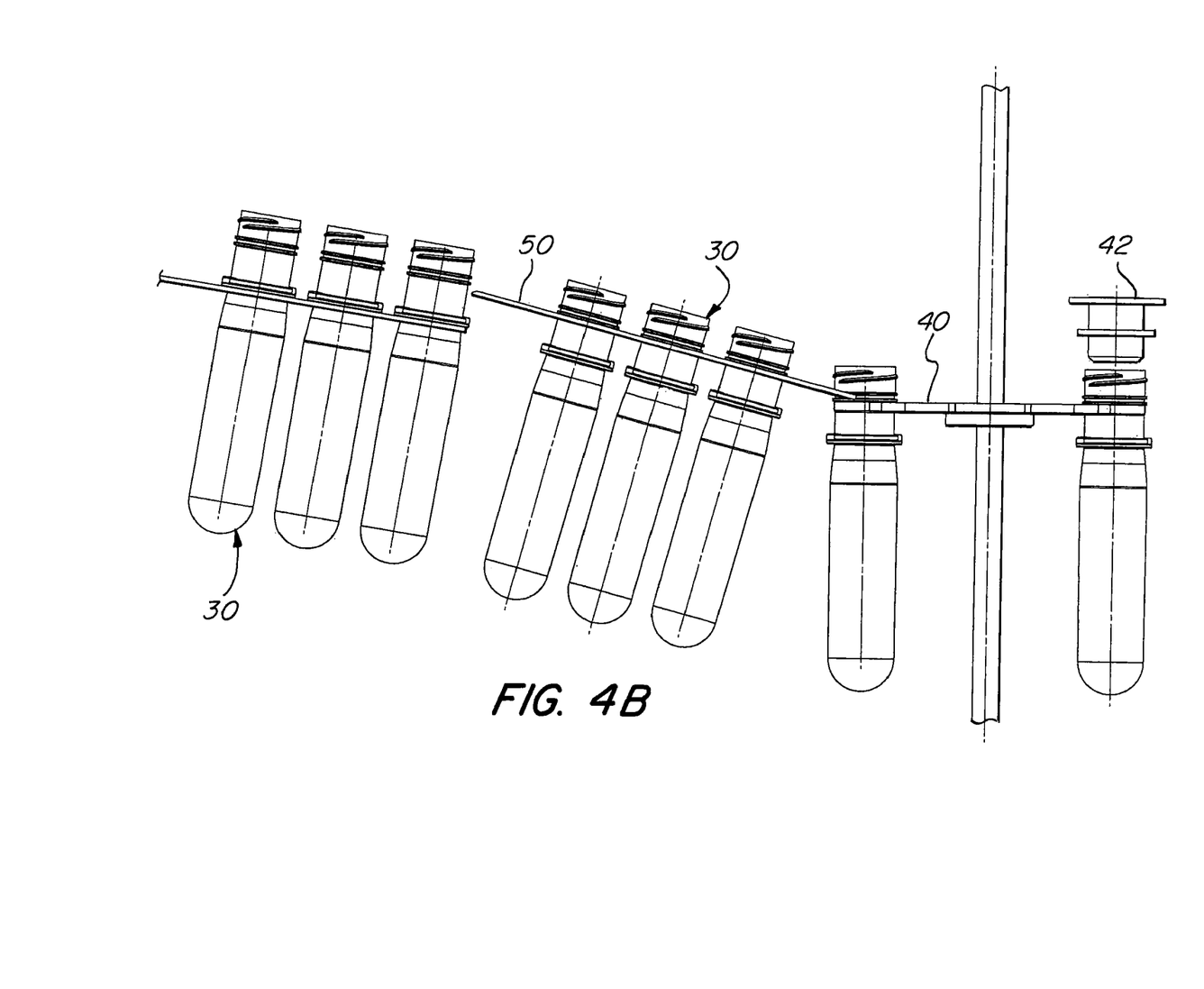
FIG. 4B is a diagrammatic side view of the preforms being moved along infeed rails to the infeed wheel and a spindle about to be inserted into a preform.
Figure 5:
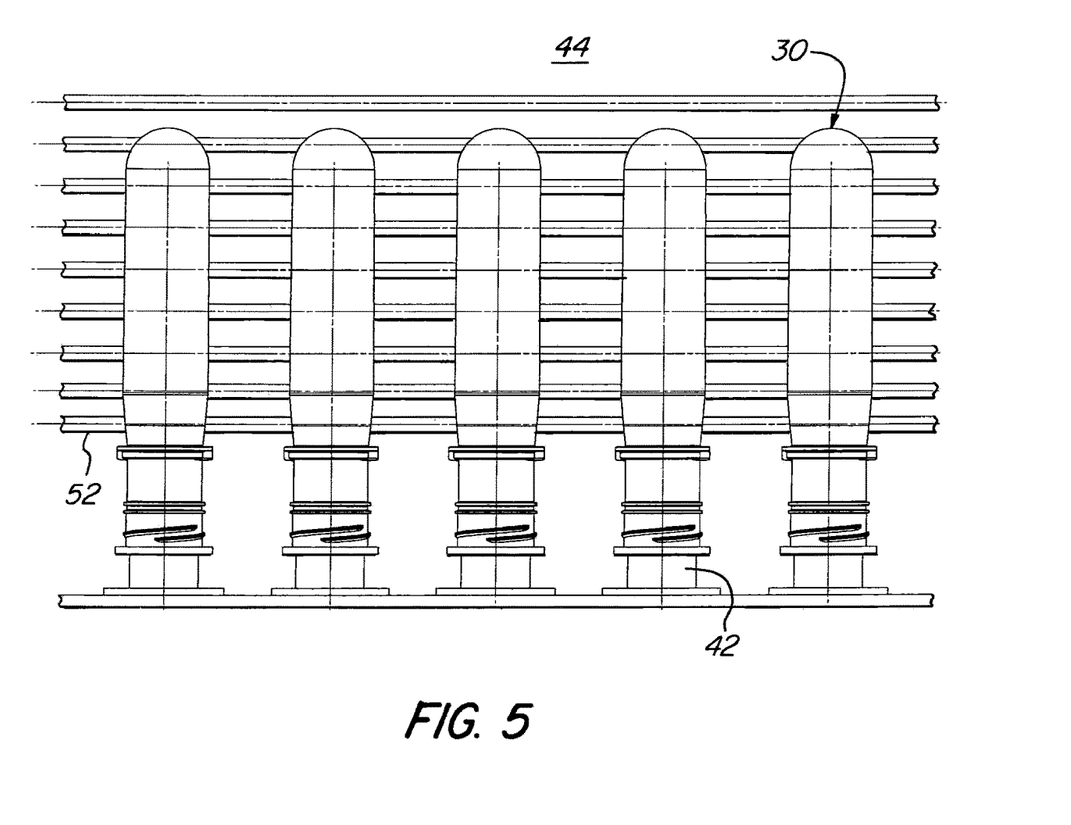
FIG. 5 is a diagrammatic view of the preforms being carried on spindles through a heating chamber.
Figure 6:
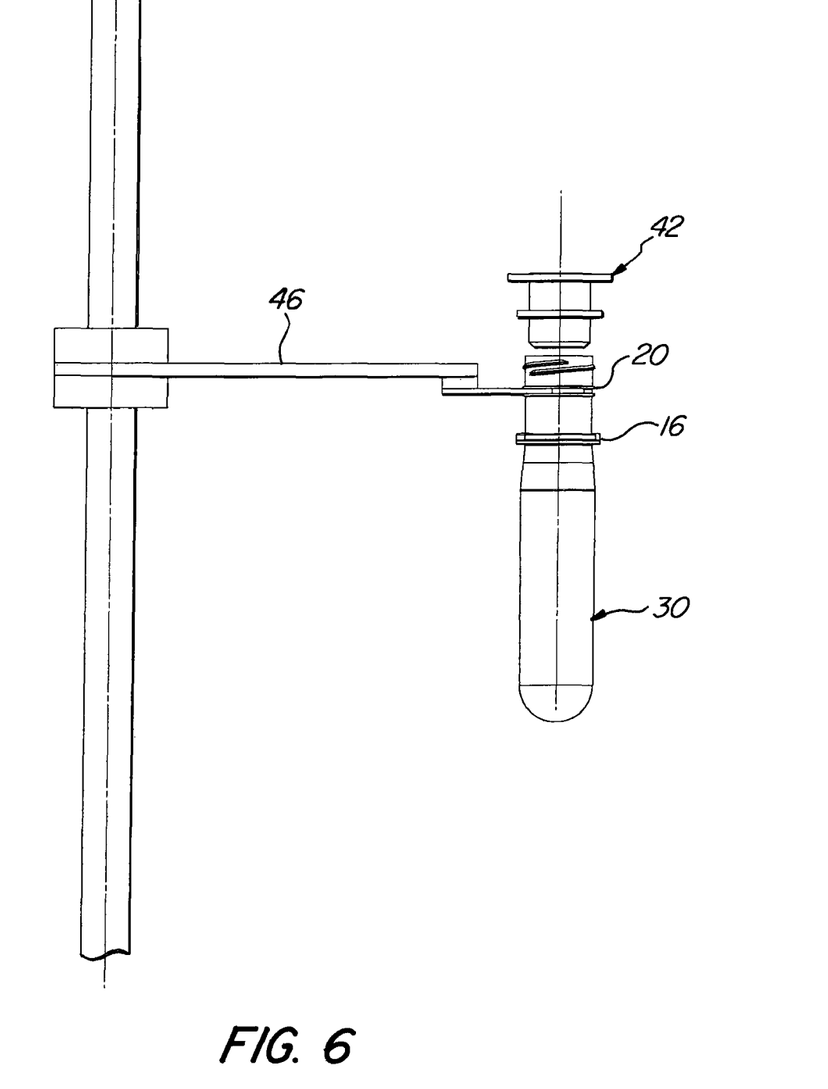
FIG. 6 is a diagrammatic view of the preform disposed in a gripper and the spindle being withdrawn therefrom.
Figure 8:
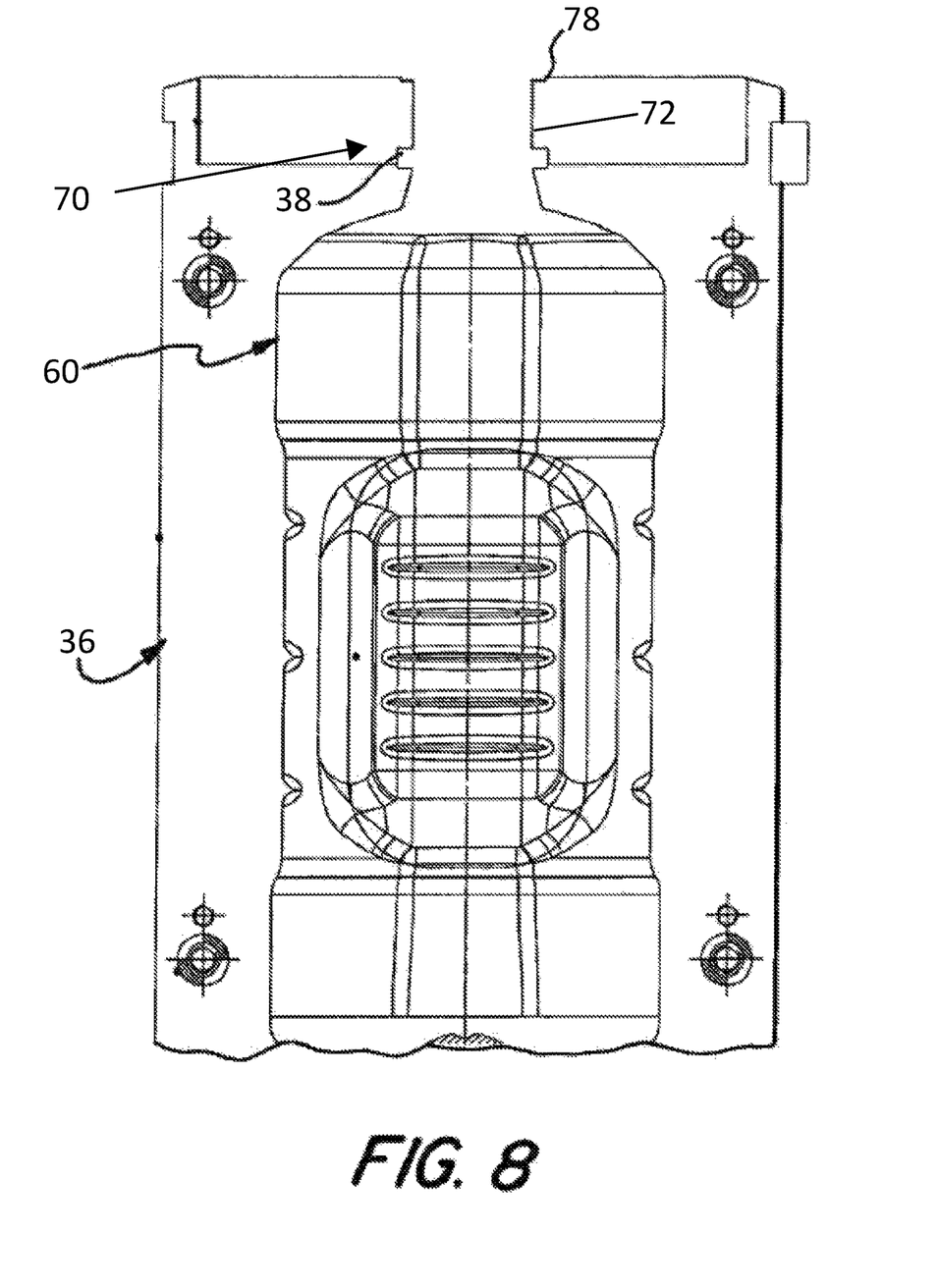
FIG. 8 is a sectional view of the mold.

As seen in FIG. 3, the preform 30 is placed in the cavity 34 of a blow mold generally designated by the numeral 36 and the lower portion of the neck finish 12 including the first collar 16 is seated in the mold cavity 34. Shown in FIG. 8 is a sectional view of the blow mold 36. As shown in FIGS.

3 and 8, the mold cavity 34 includes a body receiving portion 60 and a neck receiving portion 70. As also shown in FIG. 8, the neck receiving portion 70 has a circumferential recess 38. As shown in FIG. 3, when the preform 30 is placed in the cavity 34 of the blow mold, the first collar 16 is seated in the circumferential recess 38. As seen in FIG. 3, the height of the first collar 16 is substantially the same as the height of the circumferential recess 38. Thus, as illustrated in FIG. 3, when the first collar 16 is seated within the circumferential recess 38 (such as shown in FIG. 3), vertical movement of the preform 30 relative to the blow mold 36 is restricted. The upper portion of the neck finish 12 including the second collar 18 and thread formations 22 are disposed above the mold 36.

Figure 7:
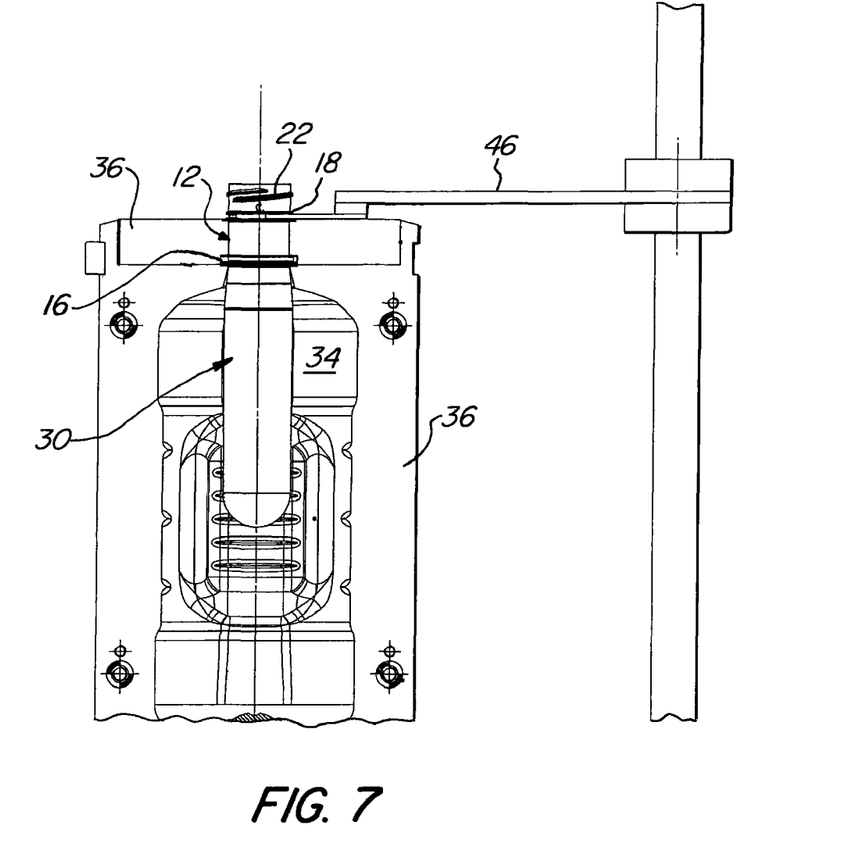
FIG. 7 is a diagrammatic illustration of the preform being deposited in the mold by the gripper.

As shown in FIGS. 3 and 8, the neck receiving portion 70 of the blow mold 36 also includes a neck cavity 72. As shown in FIGS. 3, 7 and 8, the height of the neck cavity 72 generally corresponds to the distance between the first collar 16 and the second collar 18. As also shown in FIGS. 3, 7 and 8, the width of the neck cavity 72 is substantially the same as the width of the neck finish 12 located between the first collar 16 and second collar 18.

In the process of molding the bottle of the present invention as seen in FIGS. 4-7, the molded preforms 30 are fed along rails 50 and loaded into an infeed wheel 40 which is at the same level as the top surface of the mold 36. A spindle nose 42 is moved downwardly into the neck finish 12 of the preform 30, and it carries the preform 30 through an oven 44 in which it is conditioned by the heat lamps 52. The neck finish 12 is desirably shielded as the preform passes through the oven 44 and the spindle nose 42 is rotated to rotate the preform 30 to provide uniform heating. When the preform 30 exits the oven 44, the neck finish 12 is disposed upwardly. At the end of the oven 44, a gripper 46 engages the preform neck finish 12 between the transfer rings 20 of the second collar 18, and the spindle nose 42 is withdrawn therefrom and moved upwardly. As shown in FIGS. 3 and 8, the neck receiving portion 70 of the blow mold 36 includes a circumferential seat 78 located along the top surface of the mold 36. The gripper 46 carries the preform 30 to the mold 36 and deposits the preform 30 in the mold cavity 34 with the second collar 18 being disposed above and seating on the top surface of the mold 36 in the circumferential seat 78. The mold 36 is then closed about the preform 30. Following the blow and cool cycle, the finished bottle 2 is removed from the mold 36. As shown in FIGS. 3, 7 and 8, the width of the neck cavity 72 is less than the width of the circumferential seat 78 and less than the width of the circumferential recess 38.

In the illustrated embodiment, the lower collar 16 has a stepped configuration with the upper step being of lesser diameter and providing a pair of lugs 54 which cooperate with a closure (not shown) to provide a child-proof and/or tamper-evident bottle.

As is well known, some resins can be oriented to provide greater strength in smaller thicknesses, and polyethylene terephthalate (PET) resins are widely employed. However, polyolefins and other non-orientable resins are also blow molded.

Since the neck finish must be formed to relatively close tolerances to mate securely and seal with a closure, it is desirable to mold the desired neck finish as a part of the preform. To avoid distortion of the neck finish during the blow molding of the bottle body, most of the neck finish is seated in a closely conforming cavity in the mold so that it will not be expanded during the blowing operation.

To facilitate transfer of the preform from the injection molding machine and proper positioning in the blow mold, the second collar is formed on the neck finish adjacent its upper end. This collar can ride on a pair of rails for movement from the molding station to the blowing station. It is also engageable by a gripper for controlled movement of the preform, and it seats on the mold or in a cooperating recess in the mold cavity.

In the illustrated embodiment, this grippable and positioning collar is provided by a pair of axially spaced flanges and the gripper engages between them. However, a single circumferential flange may be employed, desirably with a groove immediately thereabove to seat the gripper.

Because of the elongated neck finish, this collar and the closure may be encircled by a shrink wrapped band in the filled bottle to create a tamper evident seal.

Thus, it can be seen that bottles with extended neck finishes can be readily produced by providing molds which have a cavity configured to receive the lower portion of the elongated neck finish including a collar spaced closely to the shoulder on the body of the bottle. The upper or second collar is positioned to be disposed above the upper surface of the mold, and the protruding upper portion of the neck finish is within the vertical clearance provided in most conventional blow molding equipment.

What is claimed is:

1. A system for blow molding, the system comprising:
    a preform, the preform comprising a closed body, an open end, and a neck located between the closed body and the open end, wherein the neck comprises a thread formation proximate the open end, a flange, and a collar proximate to the closed body;
    a gripper configured to engage the neck of the preform between the thread formation and the collar; and
    a mold, the mold comprising:
        a body receiving portion into which the closed body of the preform is positioned during a blow molding operation; and
        a neck receiving portion coextensive with the body receiving portion and comprising a circumferential recess, a circumferential seat, and a neck cavity, wherein the circumferential recess has a first width and the neck cavity has a second width that is less than the first width, and wherein during the blow molding operation, the circumferential recess is configured to engage an outer circumference of the collar of the preform with the circumferential seat engaging an outer circumference of the flange, with the flange sitting within the seat on an uppermost surface of the mold so as to leave the thread formation and open end disposed outside of the neck cavity and mold, and with the neck cavity engaging the neck between the collar and the thread formation.

2. The system of claim 1, wherein the preform further comprises the flange as one of a pair of axially spaced transfer rings located between the thread formation and the collar and wherein the gripper is configured to engage the neck of the preform between the pair of axially spaced transfer rings.

3. The system of claim 1, wherein the preform further comprises the flange as a single flange and further comprises a groove, both the single flange and the groove being located between the thread formation and the collar such that the groove is located on a same side of the single flange as the thread formation, and wherein the gripper is configured to engage the groove.

4. The system of claim 1, further comprising a spindle nose configured to engage an interior surface of the neck of the preform.

5. The system of claim 4, further comprising an oven through which the spindle nose is configured to transport the preform so as to heat the closed body of the preform.

6. The system of claim 5, wherein the spindle nose is configured to rotate along a longitudinal axis of the preform while the preform is transported through the oven.

7. The system of claim 4, wherein the preform further comprises the flange located between the thread formation and the collar, wherein the system further comprises an infeed wheel configured to hold the preform on a same side of the flange as the collar, and wherein the spindle nose is configured to remove the preform from the infeed wheel.

8. The system of claim 7, further comprising a rail system over which the preform is transported to the infeed wheel.

9. The system of claim 1, wherein the preform further comprises the flange located between the thread formation and the collar, wherein the neck receiving portion of the mold further comprises the circumferential seat positioned such that the neck cavity is located between the circumferential recess and the circumferential seat, and wherein the flange rests on the circumferential seat during the blow molding operation.

10. The system of claim 9, wherein the circumferential seat has a third width, the second width of the neck cavity being less than the third width.

11. The system of claim 10, wherein the third width of the circumferential seat is less than the first width of the circumferential recess.

12. The system of claim 1, wherein during the blow molding operation, the neck receiving portion is configured to engage an entire length of the preform neck that extends from the collar to the flange sitting within the circumferential seat.

* * * * *